United States Patent [19]

Hitchcock

[11] Patent Number: 4,848,493
[45] Date of Patent: Jul. 18, 1989

[54] LOAD SENSING STRUCTURE FOR WEIGHING APPARATUS

[75] Inventor: Robert W. Hitchcock, Branford, Conn.

[73] Assignee: Revere Corporation of America, Wallingford, Conn.

[21] Appl. No.: 260,151

[22] Filed: Oct. 20, 1988

[51] Int. Cl.$^4$ .................... G01G 3/14; G01G 3/08; G01L 1/22

[52] U.S. Cl. .................... 177/211; 177/229; 73/862.65

[58] Field of Search .................... 177/211, 229; 73/862.65

[56] References Cited

U.S. PATENT DOCUMENTS

| | | | |
|---|---|---|---|
| 4,600,066 | 7/1986 | Griffen et al. | 177/229 X |
| 4,616,723 | 10/1986 | Pietzsch et al. | 177/211 |
| 4,785,896 | 11/1988 | Jacobson | 177/211 |

Primary Examiner—George H. Miller, Jr.
Attorney, Agent, or Firm—McCormick, Paulding & Huber

[57] ABSTRACT

A load sensing structure for a weighing scale deck includes two or more low profile flexure members, each of which is shaped like the letter E with two outer legs secured to the deck and the inner leg to the platform. The latter has twice the bending strength and stiffness of the former. All legs have their ends connected cantilever fashion to either a common base or to one or the other of the deck and platform. Strain gages on one leg provide complementary inputs to a bridge circuit under weight loads but tend to cancel their effects on the bridge circuit under other load conditions.

16 Claims, 3 Drawing Sheets

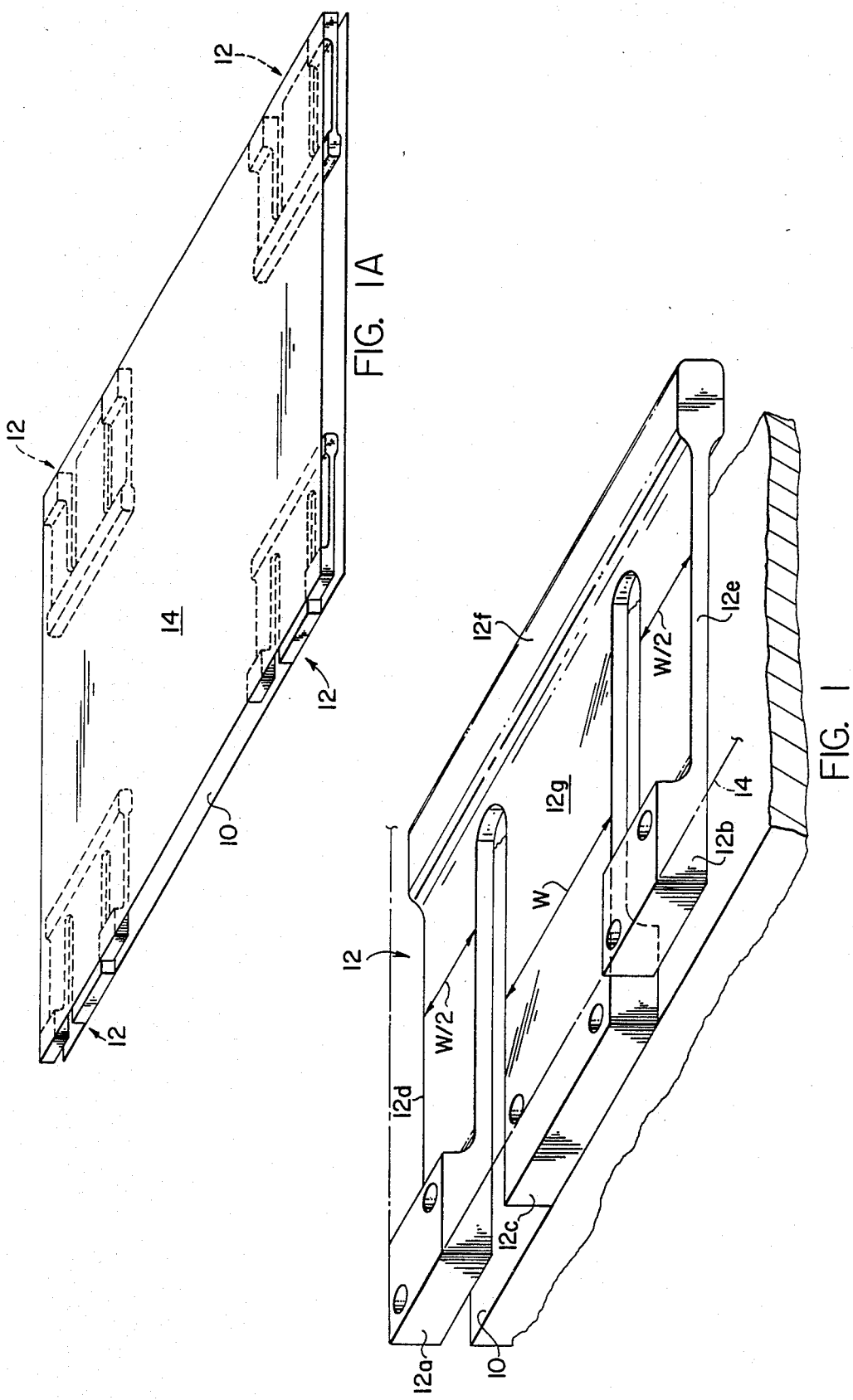

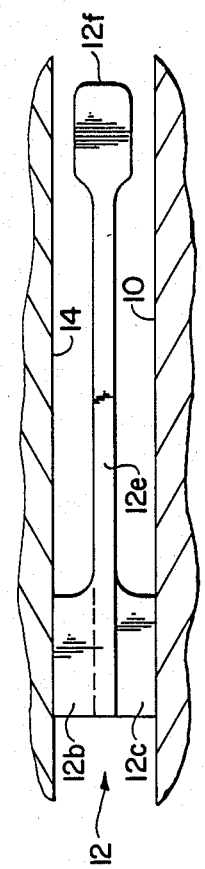
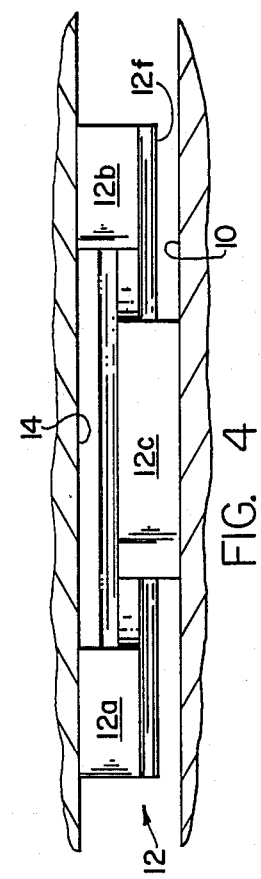
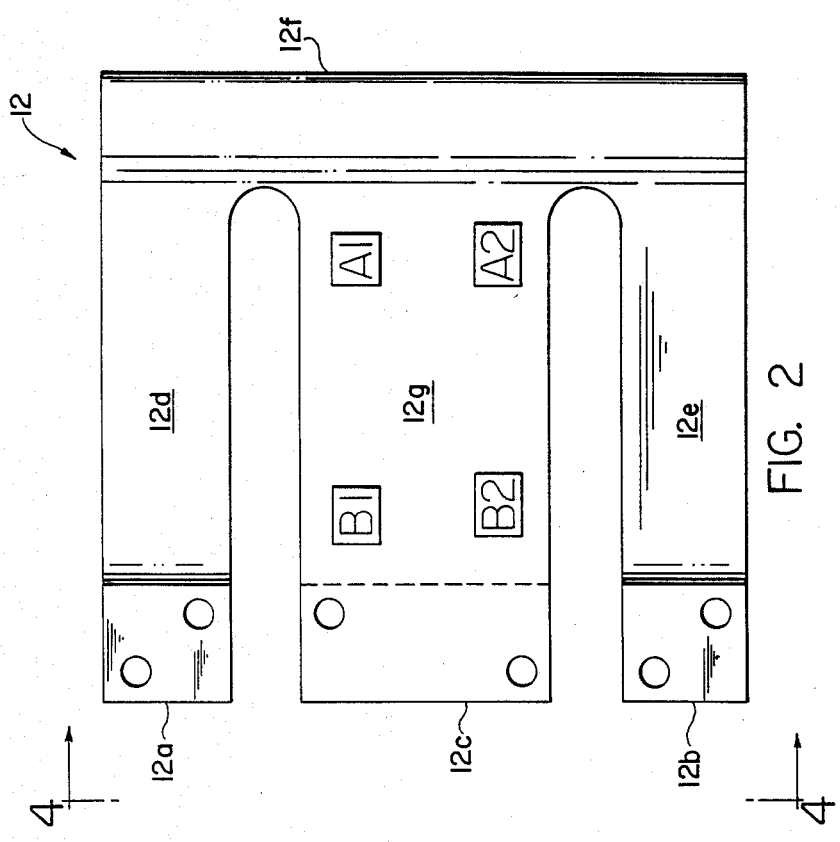

LOAD SENSING STRUCTURE FOR WEIGHING APPARATUS

The present invention relates generally to weighing apparatus of the type utilizing load sensing structures for generating electrical signals proportional to a load provided on a deck that is supported by at least two flexure members, each member having strategically located strain gages for generating electrical signals in a bridge circuit. The bridge circuit provides an output proportional to the load placed on the deck.

This invention relates to an improvement over that disclosed and claimed in copending patent application Ser. No. 107,972, filed Oct. 13, 1987 by Walter E. Jacobson, now U.S. Pat. No. 4,785,896, and assigned to the assignee herein. The general purpose of the present invention is identical to that of the copending application that is to provide a load sensing structure wherein the configuration and orientation of the flexure members when taken in combination with the location provided for the strain gages provides input signals for a Wheatstone bridge circuit such that side loads exerted on the deck and on the load sensing structure do not contribute significant errors to the Wheatstone bridge output during the normal weighing operation.

In both the prior application and in the present disclosure the deck is generally rectangular in configuration and the load sensing structure includes at least two flexure members, and preferably four flexure members adjacent the four corners of the rectangle, to support the deck in spaced parallel relationship to an underlying platform or other fixed structure. Each flexure member is strain sensitive in the vertical direction having oppositely facing attachment portions secured to the deck and to the platform respectively. In the prior copending application an intermediate portion of the flexure member is provided between said attachment portions and preferably has a generally U-shape with generally parallel flexure legs or beams connected cantilever fashion to the attachment portions. These legs extend away from the attachment portions and generally parallel relationship to one another and to the point of the rectangular deck. The same is true of the present disclosure except that the intermediate portion of each flexure member not only has a general U-shape, but the U-shape is oriented generally horizontally rather than vertically as is true of the prior application. Another significant difference can be attributed to the fact that two U-shaped intermediate portions are joined along one common leg in each flexure member in accordance with the present disclosure whereas in the prior copending application the intermediate portion of each flexure member defines a single U-shape. Both versions of the invention do have a rigid base which serves to connect free ends of the cantilevered flexure legs to one another. However, in the present disclosure this base also serves to connect or to define a common leg for each of the two U-shaped intermediate portions.

In both the prior invention and in the present case the flexure members are fitted with at least two strain gages on at least one of the legs of the U-shaped intermediate portion or portions. The first one of these two strain gages is provided closer to an associated attachment portion than the other strain gage. The other strain gage is provided closer to the base then is the first strain gage. As a result of this geometry for the flexure member and as a result of these locations for the two strain gage elements both strain gages can be provided in a conventional bridge circuit so as to complement one another in response to loads imposed perpendicularly to the deck. Furthermore these strain gages tend to cancel the signals generated by one another as a result of side loads or components of loads imposed on the deck that are oriented parallel to the plane of the deck structure itself. For example, side loads imposed on the deck structure and/or loads imposed on the deck structure by expansion and contraction of the deck itself will not result in extraneous or erroneous signals when the weighing apparatus is used for its primary purpose of detecting downward forces perpendicular to that deck structure.

The disclosure in Ser. No. 107,972 is incorporated by reference herein and supplements the present disclosure.

BRIEF DESCRIPTION OF THE DRAWINGS

FIG. 1 is a perspective view of one flexure member constructed in accordance with the present invention and also illustrates a portion of the underlying platform in a schematic fashion, and also illustrates the weighing deck at least partially in phantom lines.

FIG. 1A is a perspective view of a scale with four flexure members supporting the deck.

FIG. 2 is a plan view of the flexure member illustrated in FIG. 1 and illustrates the placement for four strain gages.

FIG. 3 is a front elevational view of the undeformed flexure member.

FIG. 4 is a left end view of the undeformed flexure member illustrated in FIG. 3.

DETAILED DESCRIPTION

Figure 6:
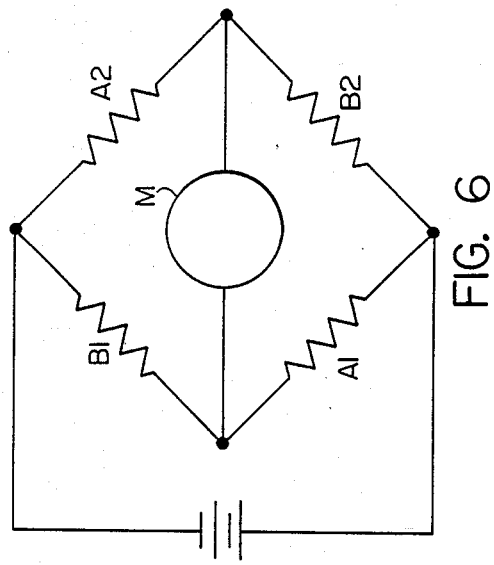
FIG. 6 a bridge circuit to show how the four strain gage elements of FIG. 2 are electrically connected.

Turning now to the drawings in greater detail, it is noted that this invention relates to a specific geometry for one of the two or more flexure members disclosed and claimed in the prior copending application referred to above. FIG. 1A shows four flexure members 12, 12 supporting a weighing scale deck 14 in spaced relationship to a fixed platform 10. FIG. 1 shows one such flexure member generally at 12, which flexure member has attachment portions for securing the flexure member to the underlying fixed platform 10 and to the weighing deck 14. The platform 10 may be similar to that shown and described in the prior copending application, and the deck 14 may be similar to that shown and described in said prior copending application also. However, the flexure member 12 of the present invention differs from that of the prior copending disclosure in that the flexure member 12 has three attachment portions 12a, 12b and 12c. Two of these three attachment portions 12a and 12b are adapted to be fixedly secured to the underside of the deck 14 in much the same manner as the single attachment portion of the prior copending disclosure is adapted to be secured to the underside of the deck. The disclosure in that prior copending application is incorporated by reference herein and it is a feature of that disclosure that screws or the like are used to secure a deck 14 to each of these attachment portions 12a and 12b. This type of connection serves to rigidly connect each of these attachment portions to the deck in such a way that the integrally connected legs 12d and 12e are supported cantilever fashion from said attachment portions 12a and 12b respectively and so that the neutral axes of these legs remain parallel to the deck 14 under loads imposed on the deck regardless of the directions associated with such loads. Thus, the neutral axis of each of the legs 12d and 12e, at the ends associated with these attachment portions 12a and 12b respectively remains parallel to the deck under loads imposed on the deck.

These flexure legs 12d and 12e are joined to one another by an integrally formed intermediate portion of the flexure member, which intermediate portion includes the thickened base 12f. A third leg 12g is also integrally connected to the base 12f and that extends between the legs 12d and 12e to provide a third attachment portion 12c, which third attachment portion is adapted to be secured to the underlying platform 10 as for example by fasteners in the form of screws such as described in the above mentioned prior copending application It is important to note that this third leg 12g has substantially the same bending strength and stiffness as the combined strength and stiffness of the two outer legs 12d, 12e. More specifically the third leg 12g has the same thickness as the outer leg 12d and 12e, but the third leg 12g has a width W that is twice that of the width W provided for the outer legs 12d and 12e. Thus, it will be apparent that the inertia of the beam 12g is twice that of the beams 12d and 12e. This geometry provides substantially symmetrical flexing for the legs 12d, 12e and 12g under loads imposed generally vertically with respect to the deck 14. It will be apparent that the bending strength and stiffness for each of the outer flexure legs 12d and 12e is one-half that of the center flexure leg 12g as a result of the fact that the width W of the latter is twice the width of each of the former.

As in the prior copending case referred to above, strain gage means is provided on at least one of the three flexure legs. Said strain gage means is preferably in the form of at least two and preferably four individual strain gages A1, A2 and B1, B2 provided in spaced relationship to one another on the flexure leg 12g as shown in FIG. 2. More particularly, two tension sensitive strain gages A1, A2 are provided closer to the base 12f of the flexure 12 and two compression sensitive strain gages B1, B2 are provided closer to the attachment portion 12c.

Figure 5:
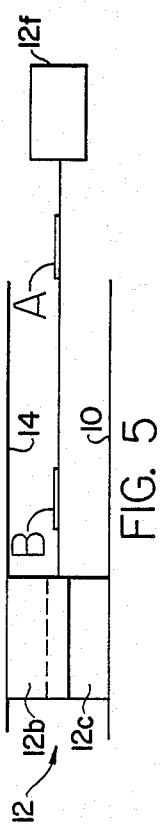
FIG. 5 illustrates schematically the flexure member of FIGS. 1 and 2 in an undeformed condition.
Figure 5A:
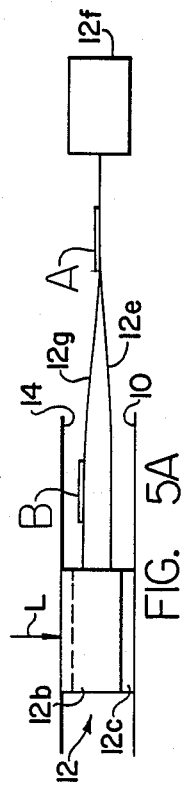
FIG. 5A illustrates schematically the deflection or deformation of the flexure member of FIG. 3, that is with a downward or weight force L imposed perpendicularly or normal to the deck.

Thus, the strain gages A1 and B1 are spaced from one another as are the gages A2 and B2. When these four strain gages are provided in a Wheatstone bridge circuit as suggested in FIG. 6. By reference to FIG. 5 and FIG. 5A one can see that B1 and B2 are placed in tension by the load L and that A1 and A2 are placed in compression. The result is an additive effect on the bridge circuit, leading to a relatively large cumulative effect on meter M.

It will be apparent that only two strain gages (A and B) could be provided in a simplified bridge circuit, with many of the same advantageous results. As described in the prior copending case with several flexure structures (two or more) provided between a weighing scale deck and support platform several strain gage elements can be provided in each leg of the bridge circuit for achieving a similar cumulative effect on the indicator or readout M.

Figure 5B:
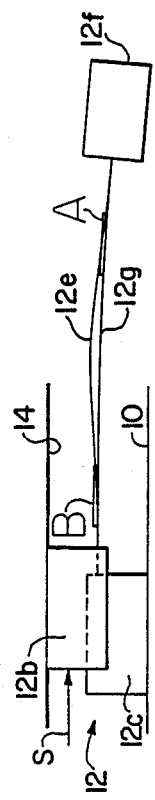
FIG. 5B illustrates schematically the deformation of the flexure member under a side load S imposed parallel to the plane of the deck.

FIG. 5B shows the effect of a horizontal component on a side force S on the deck to which the attachment portion 12b is secured. As in the FIG. 5A condition flexure leg 12g has the end adjacent portion 12c oriented parallel the deck (and platform, i.e. horizontal). Thus, the neutral axis of this cantilever support is oriented parallel that of leg 12d and its end at the attachment portion 12. In this parallel neutral axis attachment condition for the legs 12g (and 12d not shown) under both load conditions (FIG. 5A and FIG. 5B) produces the same results realized in the prior copending case. However, these advantages are realized in an improved structure. The structure of the present invention permits the deck to be provided in closer vertical proximity to the underlying support or platform than was possible with the structure disclosed in that prior copending case.

Finally, in a typical scale (FIG.. 1A) four flexure members are provided adjacent the four corners of the rectangular deck 14. Each flexure member 12 has at least one leg fitted with at least two strain gage elements (not shown) and all eight elements are provided in a bridge circuit such that the adjacent elements gages are electrically connected in a common bridge circuit, all as described in greater detail in said copending patent application.

I claim:

1. A load sensing structure includes a platform and a generally planar deck provided in spaced relationship to the platform, at least one strain sensitive flexure member having oppositely facing attachment portions, a first of said attachment portions fixedly connected to said platform, a second of said attachment portions fixedly connected to said deck, and at least a third attachment portion fixedly connected to only one of said platform and deck, intermediate portions of said flexure member connecting said first, second and third attachment portions, said intermediate portions including first, second and third flexure legs, said intermediate portions also including a common base that is not connected to either said platform or said deck except through said flexure legs, said flexure legs having ends thereof connected cantilever fashion to said first, second and third attachment portions respectively, and said first, second and third flexure legs having opposite ends connected cantilever fashion to said base, said cantilever connected ends of said flexure legs associated with said attachment portions having their respective neutral axes oriented parallel to one another and to said planar deck, said cantilever connected flexure leg opposite ends having their respective neutral axes so connected to said base as to remain parallel to one another under load imposed on said deck.

2. The load sensing structure of claim 1 wherein said third flexure leg and only one of said platform and deck associated flexure legs are of similar bending strength and stiffness and are fixedly connected to said only one of said platform and deck.

3. The load sensing structure of claim 2 wherein said flexure leg not so connected to said only one of said platform and deck has a bending strength and stiffness corresponding to that of said flexure legs associated with said only one of said platform and deck combined.

4. The load sensing structure of claim 1 wherein said first, second and third flexure legs are oriented generally parallel to said deck, and are spaced from one another horizontally so that a load imposed on said deck causes bending of said flexure legs without interferring with one another.

5. The load sensing structure of claim 1 wherein at least two such flexure members so support said deck in spaced relationship to said platform.

6. The load sensing structure of claim 1 further including strain gage means provided on at least one flexure leg, and electric circuit means for sensing changes in resistivity of said strain gage means in response to strains caused by load forces imposed on said deck and reacted by said platform.

7. The load sensing structure of claim 6 wherein said strain gage means comprises at least two individual strain gage elements provided in spaced relationship to one another on said one flexure leg, one of said two gage elements being provided closer to said flexure leg attachment portion than the other of said two strain gage elements.

8. The load sensing structure of claim 7 wherein the other of said two strain gage elements is provided closer to said base than is said one strain gage element.

9. The load sensing structure of claim 7 wherein said electric circuit means comprises a Wheatstone bridge circuit with at least four resistive elements so connected to one another as to provide an indication of changes in the resistivity of any of said four elements, said at least two individual strain gage elements comprising two of said four bridge circuit elements.

10. The load sensing structure of claim 9 wherein the other of said two strain gage elements is provided closer to said base than is said one strain gage element.

11. The load sensing structure of claim 9 wherein said flexure member is symmetrical about a central plane oriented perpendicular to said planar deck.

12. The load sensing structure of claim 1 wherein said deck is of generally rectangular configuration and wherein at least four flexure members support said deck in spaced relation to said platform, said flexure members having parallel planes of symmetry oriented perpendicular to said deck.

13. The load sensing structure of claim 12 further including strain gage means on at least one flexure leg of each flexure member, and electric circuit means for sensing changes in resistivity of said strain gage means in response to strains caused by load forces imposed on said deck and reacted by said platform.

14. The load sensing structure of claim 13 wherein said strain gage means comprises at least two individual strain gage elements provided on at least one leg of each flexure member, said strain gage elements on each such flexure member leg being spaced from one another with one such gage element closer to said flexure leg's attachment portion and the other such gage element provided closer to said flexure leg's base.

15. The load sensing structure of claim 13 wherein said electric circuit means comprises a Wheatstone bridge circuit with four circuit legs and at least two resistive elements in each leg of said bridge circuit to provide an indication of changes in the resistivity of any of said resistive elements, said individual strain gage elements comprising said resistive elements of said bridge circuit.

16. The load sensing structure of claim 15 wherein said at least two resistive elements in each leg of said bridge circuit comprise said at least two strain gage elements on each flexure leg of each flexure member.

* * * * *